Jan. 7, 1969  R. L. TOPPER ET AL  3,421,050
METHOD OF AND APPARATUS FOR SUSPENDING PARTICLES IN A CONDUIT
Filed April 23, 1965
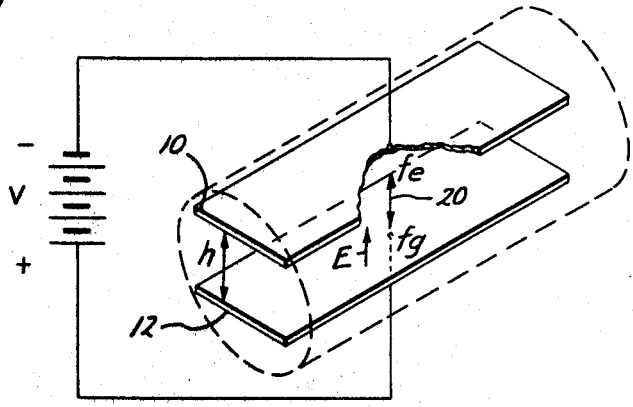
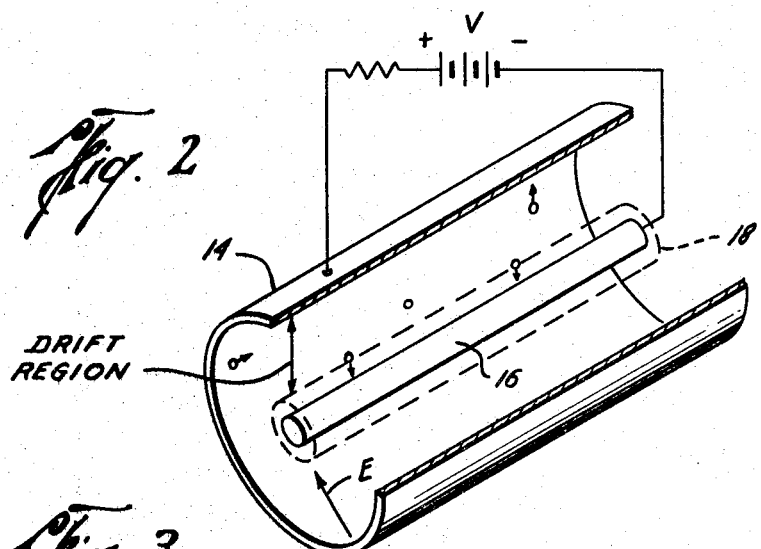
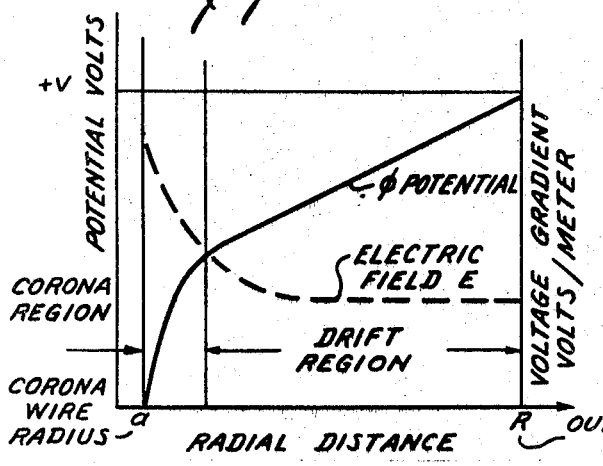
Robert L. Topper
William W. Cofield
Amos F. Williams
Raymond C. Foster
Herman N. Woebcke
Albert W. Goldman
Alexander Kusko
INVENTORS
BY
ATTORNEYS Jan. 7, 1969  R. L. TOPPER ET AL  3,421,050
METHOD OF AND APPARATUS FOR SUSPENDING PARTICLES IN A CONDUIT
Filed April 23, 1965  Sheet 2 of 6

Robert L. Topper
William W. Cofield
Amos F. Williams
Raymond C. Foster
Herman N. Woebcke
Albert W. Goldman
Alexander Kusko
INVENTORS BY *James F. Weiler*
*Jefferson D. Giller*
*William E. Stout*
*Paul L. DeVerter II*
ATTORNEYS Robert L. Topper
William W. Cofield
Amos F. Williams
Raymond C. Foster
Herman N. Woebcke
Albert W. Goldman
Alexander Kusko
INVENTORS

BY
ATTORNEYS

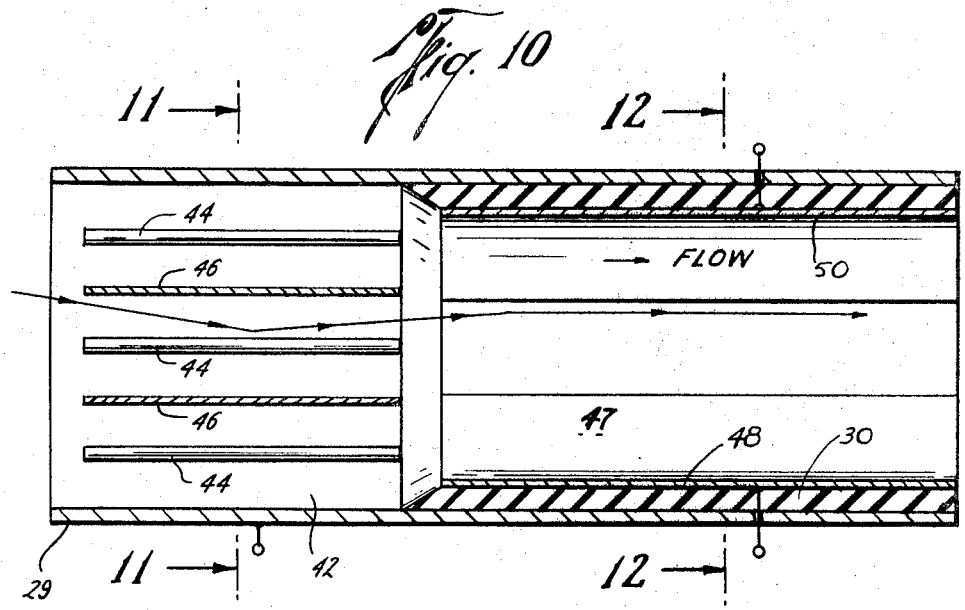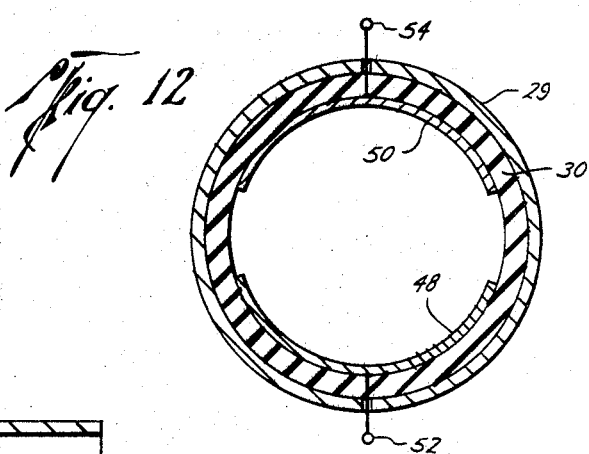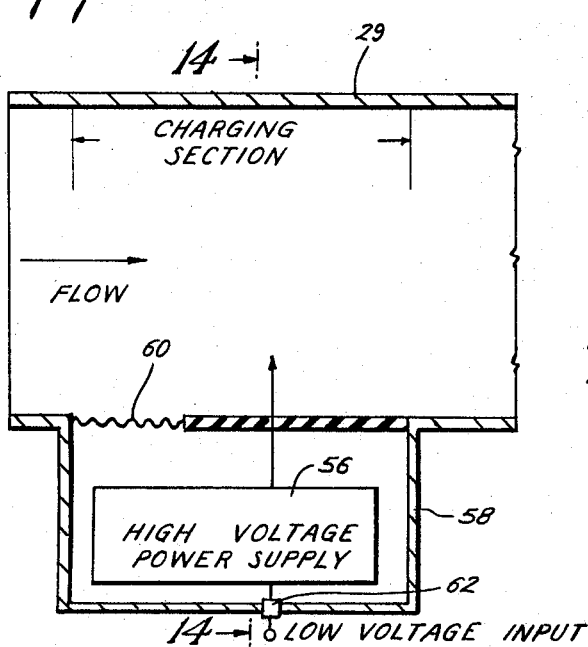

Robert L. Topper
William W. Cofield
Amos F. Williams
Raymond C. Foster
Herman N. Woebcke
Albert W. Goldman
Alexander Kusko
INVENTORS BY *James F. Weiler*
*Jefferson D. Giller*
*William L. Stout*
*Paul L. DeVerter II*
ATTORNEYS

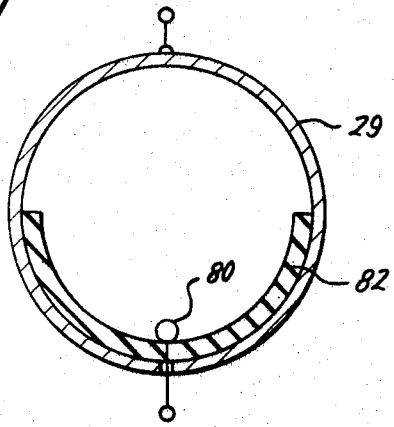
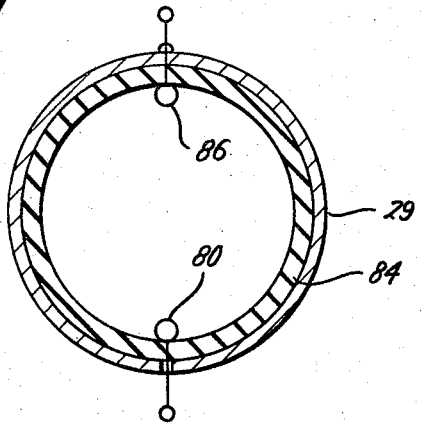
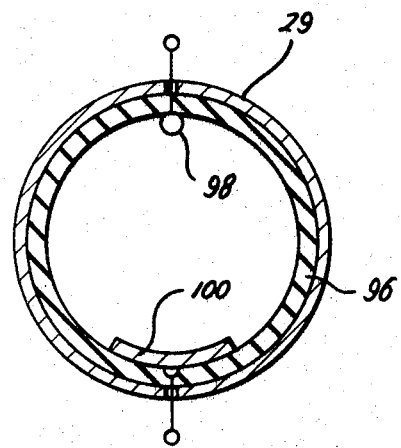
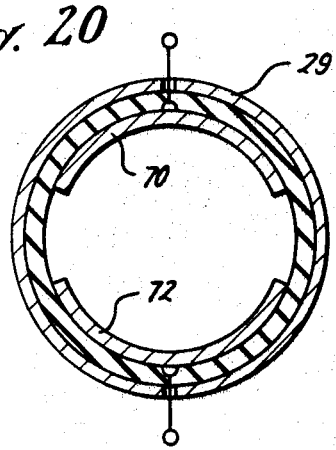
Robert L. Topper
William W. Cofield
Amos F. Williams
Raymond C. Foster
Herman N. Woebcke
Albert W. Goldman
Alexander Kusko
INVENTORS

3,421,050
METHOD OF AND APPARATUS FOR SUSPENDING PARTICLES IN A CONDUIT
Robert L. Topper, William W. Cofield, and Amos F. Williams, Houston, Tex., Raymond C. Foster, Garden City, N.Y., and Herman N. Woebcke, Waltham, Albert W. Goldman, Newton, and Alexander Kusko, Newton Center, Mass., assignors, by direct and mesne assignments, to Transcontinental Gas Pipeline Corporation, Houston, Tex., a corporation of Delaware
Continuation-in-part of application Ser. No. 349,299, Mar. 4, 1964. This application Apr. 23, 1965, Ser. No. 451,695
U.S. Cl. 317—3  17 Claims
Int. Cl. H05f 3/00

ABSTRACT OF THE DISCLOSURE

In combination with a conduit having a gaseous carrier therein for transporting particles through the conduit, an electrical system for electrically maintaining the particles in suspension in the gas by electrically charging the particles, and providing an electrical field for levitating the charged particles. Electrically charging particles, being moved along a conduit in a gaseous carrier, by corona charging, induction charging, or friction charging, and providing electrical means parallel to the conduit for applying an electrical field for overcoming the gravitational effect on said particles. Upper and lower electrodes in the conduit for providing an electrical field therein and intermediate electrodes between said upper and lower electrodes with selected voltages applied to the intermediate electrodes to control the electrical field distribution within the conduit. An electrical power supply mounted within a pressurized region in communication with the conduit. Maintaining dielectric particles in a gaseous suspension in a conduit by coating the particles with an electrically conductive coating whereby the particles can be charged by friction.

---

Figure 4:
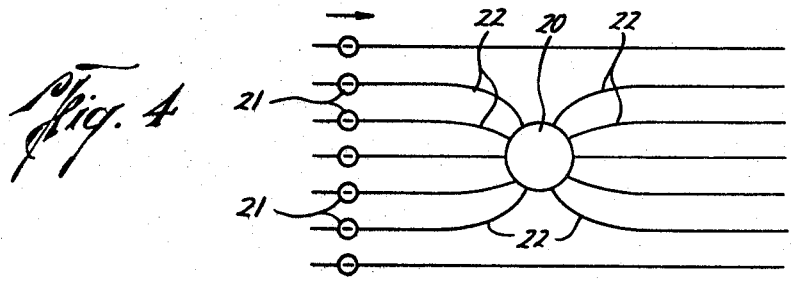

This application is a continuation-in-part application of our application Ser. No. 349,299, filed Mar. 4, 1964, now abandoned.

The present invention relates to a method of and apparatus for electrically suspending particles as they are moved along or transported through a conduit, and more particularly, the present invention relates to a method of and an apparatus for maintaining solid particles in suspension while they are being transported through a conduit or pipeline by a gas stream.

It has been proposed to transport-pulverized particles through a pipeline suspended in a gaseous carrier. However, one of the problems encountered is the so-called "saltation" effect or settling out of the particles in the pipeline. The present invention is directed to maintaining the particles in suspension while they are being propelled in a pipeline to reduce settling out, reduce wall friction, and to prevent bunching thereby reducing the amount of mechanical pumping power required to transport the particles through the pipeline. The present invention is generally directed to a method of and an apparatus for maintaining particles in suspension in the pipeline by electric forces while they are being propelled and transported through the pipeline.

A further object of the present invention is the provision of a method of and an apparatus for electrically levitating material particles being carried by a gas stream in a pipe so as to reduce the required pumping power.

A still further object of the present invention is the method of and apparatus for suspending particles in a pipeline by electrically charging the particles and providing an electric field for levitating the charged particles.

A still further object of the present invention is the provision of a method of and apparatus for maintaining particles in suspension while they are being moved along a conduit by providing electrical corona discharge means positioned parallel to the axis of the conduit for charging the particles and for applying an electric field within the conduit for levitating the charged particles.

Yet a further object of the present invention is the provision of a method of and an apparatus for suspending particles in a pipe for transportation by electrically charging the particles by friction.

Still a further object of the present invention is the provision of a method of and an apparatus for suspending solid particles in a pipe for transportation by electrically charging the particles by friction contact with an insulator in the pipe and providing upper and lower electrodes in the pipe for providing an electric field to act on the particles.

Yet a further object of the present invention is the provision of a method of and an apparatus for suspending nonconductive particles in a pipe for transportation therethrough by coating the particles with a conductive coating whereby the particles may be charged electrically by friction contact against an insulated pipe.

Yet a further object of the present invention is the provision of a method of and an apparatus for maintaining charged particles in suspension while they are being moved along a conduit by providing electrodes in the conduit and levitating the particles both with and without the use of an externally applied electric field on the electrodes.

A further object of the present invention is the provision of a method of and an apparatus for electrically charging material particles by a corona discharge, by induction charging by contact with an electrode or by friction, whereby like-charged particles will repel each other thereby preventing bunching of the particles in a conduit.

Still a further object of the present invention is the provision of a method of and apparatus for electrically charging material particles being carried in a gas stream in a pipeline by providing a separate charging section or by providing charging along the bottom of the pipeline.

A still further object of the present invention is the provision of a method of and an apparatus for electrically suspending particles in a pipe for transportation therethrough in a gaseous carrier wherein the electrical system includes upper and lower electrodes adapted to be energized with a voltage to produce a net electric force upwardly on the charged particles and wherein the electrodes run parallel to the axis of the pipe.

A still further object of the present invention is the provision of a method of and apparatus for suspending particles in a conduit in an electric field by providing intermediate electrodes mounted inside of the conduit between upper and lower electrodes and energizing the electrodes with selected voltages to control the electric field distribution within the pipe.

Yet another object of the present invention is the provision of a method of and an apparatus for suspending particles in a pipeline which are transported through the pipeline by a high pressure gas stream in which the electric power supply is mounted within a pressurized region in communication with the pipeline to take advantage of the electrical insulating properties of pressurized gas.

Figure 5:
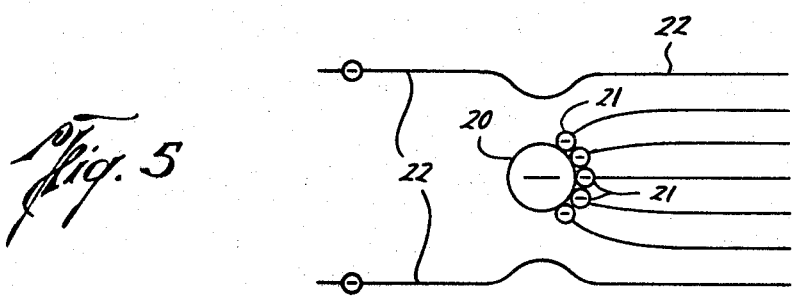
Figure 6:
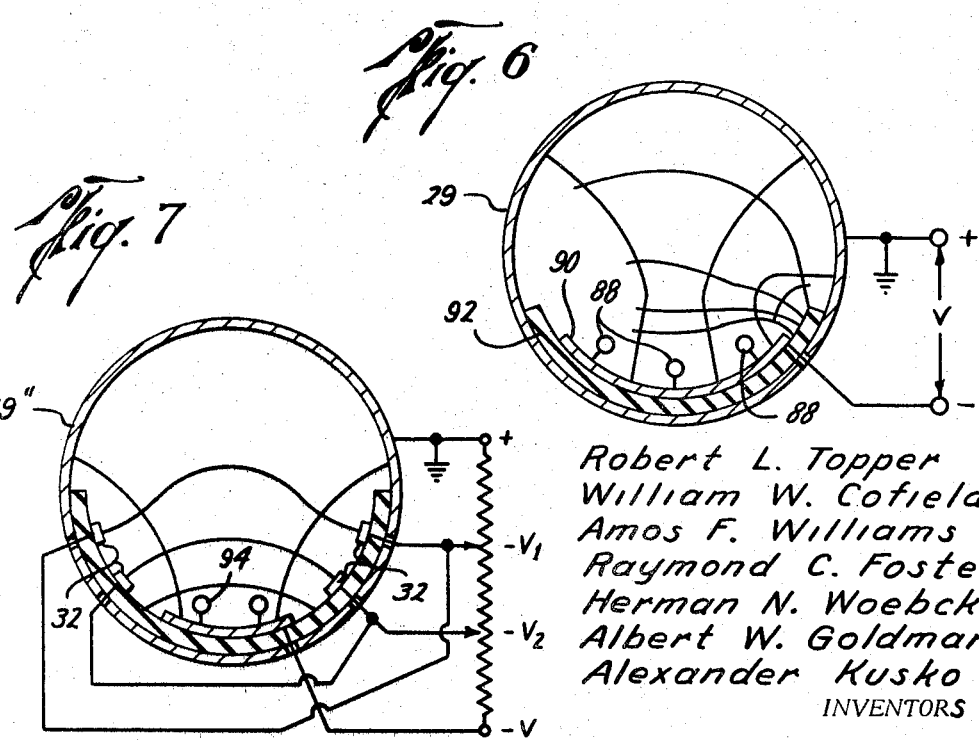
Figure 7:
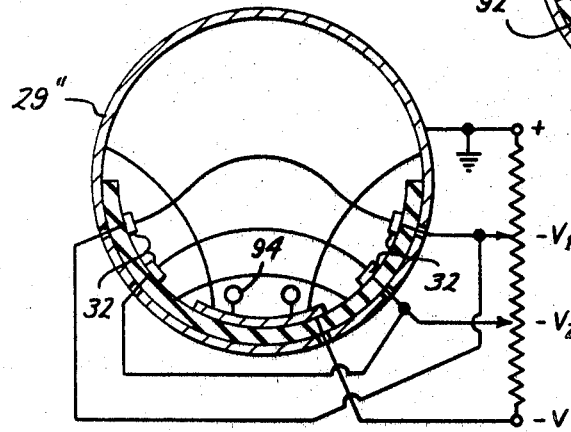
Figure 8:
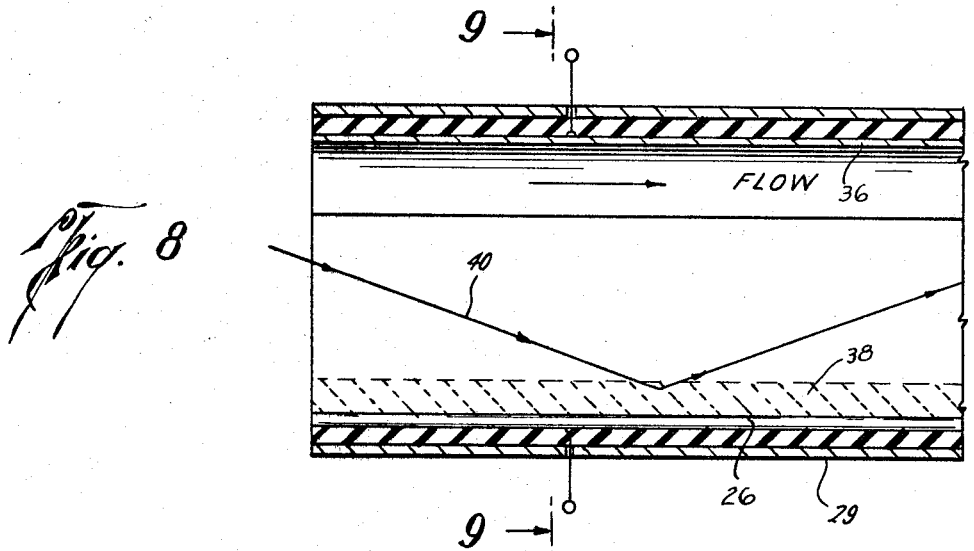
Figure 9:
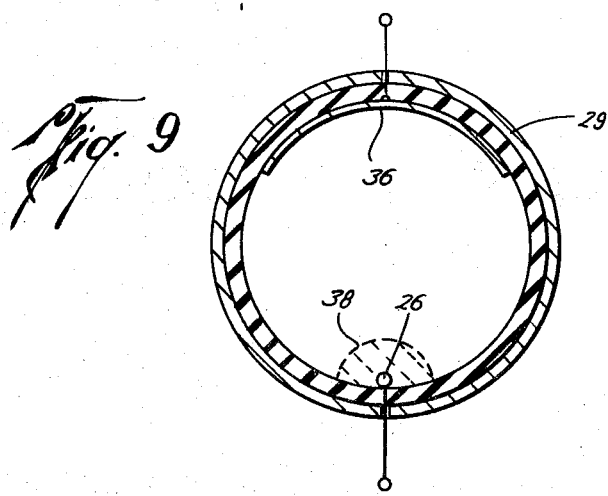
Figure 11:
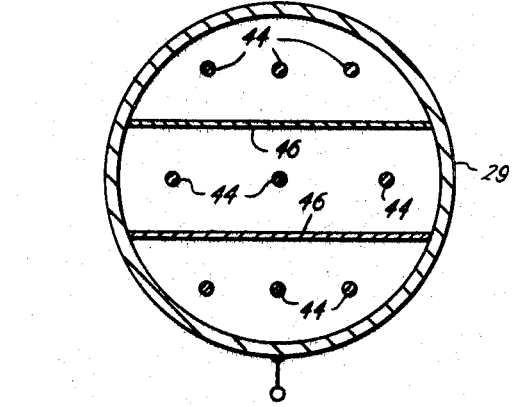
Figure 14:
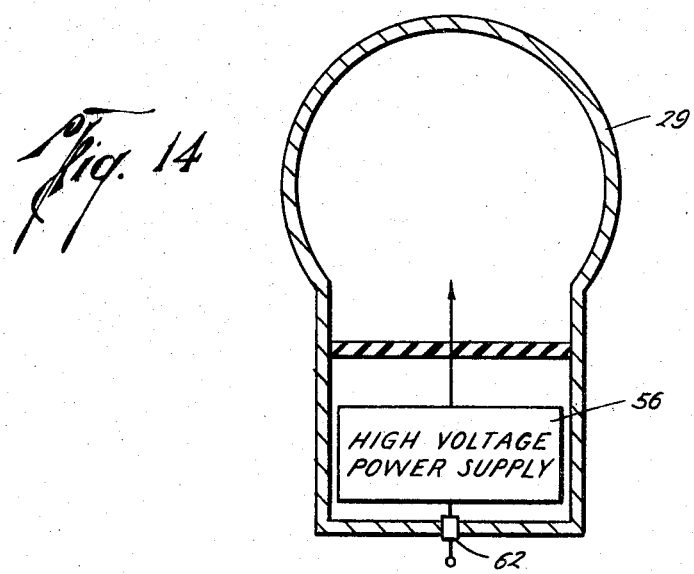
Figure 15:
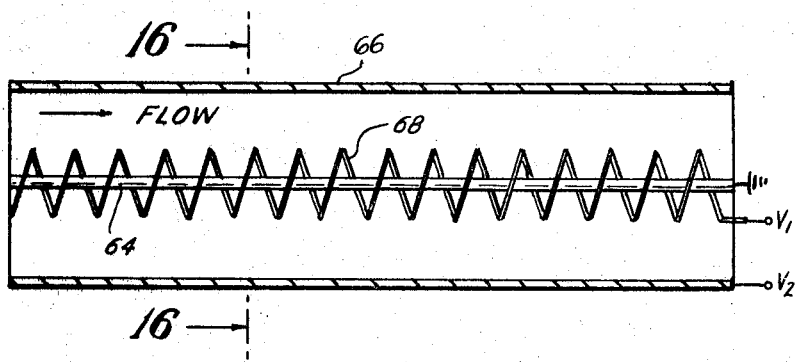
Figure 16:
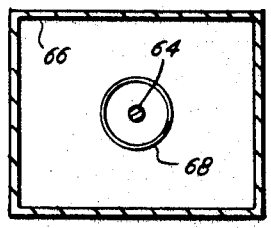

Other and further objects, features, and advantages will be apparent from the following description of presently preferred embodiments of the invention, given for the purpose of disclosure, and taken in conjunction with the accompanying drawings, where like character references designate like parts throughout the several views, and where, FIGURE 1 illustrates an isometric drawing of an electrical system, partly schematic, and partly in section, illustrating one type of electrical suspension system for suspending particles in a pipeline, FIGURE 2 is an isometric drawing partly in section and partly diagrammatic, illustrating one form of an apparatus for electrically charging particles in a pipeline, FIGURE 3 is a graph illustrating the voltage effects in a pipe between two electrodes such as shown in FIGURE 2 showing the electric potential and electric field level, FIGURES 4 and 5 are electrical schematic diagrams illustrating the charging of a particle which is placed in an electric field with FIGURE 4 showing the effect of an uncharged particle in the field and FIGURE 5 illustrating a charged particle, FIGURE 6 is a cross-sectional view, partly schematic, illustrating one configuration of a particle charging and suspension system and showing the electric fields in a pipeline as a result of a plurality of corona wires spaced along the bottom of the pipeline, FIGURE 7 is a cross-sectional view of a pipeline having upper and lower electrodes and including field electrodes to produce a more uniform field distribution in the pipeline, FIGURE 8 is a longitudinal cross-section of a pipeline showing the path of travel of a particle as it becomes charged in a pipeline having a wire electrode positioned along the bottom and an upper electrode along the top of the pipeline, FIGURE 9 is a cross-sectional view taken along the line 9—9 of FIGURE 8, FIGURE 10 is a longitudinal cross-section of a conduit with separate particle charging and particle suspension sections, FIGURE 11 is a cross-sectional view taken along the line 11—11 of FIGURE 10, FIGURE 12 is a cross-sectional view taken along the line 12—12 of FIGURE 10, FIGURE 13 is an axial cross-sectional view taken along a conduit showing the provision of a high voltage supply built into the conduit in which particles are moved therethrough by means of a pressurized gas, FIGURE 14 is a cross-sectional view taken along the line 14—14 of FIGURE 13, FIGURE 15 is an axial cross-sectional view of an electrical charging section for use in a pressurized gas conduit showing a co-axial corona electrode surrounded by a screen electrode, FIGURE 16 is a cross-sectional view taken along the line 16—16 of FIGURE 15, FIGURE 17 is a cross-sectional view of a simplified electrode configuration in a pipeline wherein the pipe is used as an upper electrode and a wire electrode is positioned along the bottom, FIGURE 18 is a cross-sectional view of a pipeline electrode having upper and lower wire electrodes for charging and suspending particles in the pipeline, FIGURE 19 is a cross-sectional view of another configuration in an insulated pipeline which is particularly useful for friction charging, and FIGURE 20 is a cross-sectional view of a pipeline having an induction charging electrical system for charging and suspending particles therein.

As previously stated, the purpose of suspending particles which are being propelled in a gaseous carrier through a conduit or pipeline is to reduce settling out, reduce wall friction and to prevent bunching to reduce the amount of mechanical pumping power required.

The principal of electrical suspension is shown in FIGURE 1 wherein a particle 20 having a charge $q$ interacts with an electric field E, the electric force $f_e$ exerted on the particle is $f_e = qE$. In a uniform electric field, the value of E is:

$$E = V/h$$

where V is the applied potential and $h$ is the spacing of the electrodes 10 and 12.

In order to levitate the particle 20, the force $f_e$ must at least equal the gravitational force $f_g$, thus, $$qE = mg$$

$$E = g/(q/m)$$

Thus, the electric field E must be adjusted to satisfy the relationship shown to balance the effect of gravity on the particle 20.

FIGURE 1 discloses a mechanism for creating an electric field for suspending particles therein. However, a useful electric force can be applied to a particle only if the particle is charged. Since a particle is normally electrically neutral, the particle may be charged by applying to it charges from an external source. Both dielectric and conductive material particles can be charged.

Several methods for particle charging will be discussed as practical for pipe system operation and are termed corona charging, induction charging, and friction charging. Corona charging utilizes an electric discharge to generate the charging ions. Induction charging is the method of charging the particles by contact with an electrode surface, and friction charging is the process of charging one body by rubbing it with another material. Referring now to FIGURE 2 a cylindrical outer electrode 14 and an axial corona wire electrode 16 are shown with a voltage V applied across the electrodes. The particle carrying gas is pumped through the section in a longitudinal axial direction.

The charging process takes place in two steps. In the first step, gas ions are produced in the corona region 18 around the corona wire 16. In the second step, these ions drift radially outward and attach themselves to the particles in the drift region thereby imparting an electric charge to the particles, so that they can be later acted upon by an electric field.

A corona discharge is an electrical phenomenon which occurs when a gas is subjected to a high electric field such that a visible discharge occurs, but an actual sparkover does not occur. Such a discharge is produced around points or small diameter wires when the potential between the points and a reference electrode is raised high enough to produce electric breakdown fields in the vicinity of the point. While the corona can be produced from either a positive or negative polarity point, we assume here a negative point corona. In a negative corona region, electrons are accelerated outward from the wire electrode 16 by the electric field created across the electrodes 14 and 16. They collide with and ionize gas molecules. The resulting negative gas ions drift out of the corona region, as best seen from the graph in FIGURE 3, towards the outer electrode 14 under the influence of the electric field and at a velocity determined by their mobility.

Thus, the corona wire 16 in FIGURE 2 produces a corona discharge 18 outwardly from the wire 16 and towards the outer electrode 14, thereby charging particles between the electrodes. The potential and field levels are shown on the graph in FIGURE 3 as a function of the radial distance outward from the center of the wire electrode 16. The electric field E has its maximum value at the surface of the corona wire 16 where it must be sufficiently large to accelerate the electrons to sustain the corona process. The field in the drift region must be sufficient to move the gas ions outward as fast as they are produced by the corona. The electric potential $\phi$ increases rapidly in the corona region, then slowly in the drift region until it reaches the value V at the outer electrode 14.

Referring now to FIGURES 4 and 5, a simplified view of the manner in which a particle 20 is charged in the drift region is shown. The negative gas ions 21 move along the electric field lines 22 and if an uncharged particle 20 is met, the ions adhere to the surface until the particle 20 is charged to the point where no electric field lines intersect it, as best seen in FIGURE 5, or where the charge on the particle 20 repels any further gas ions. Should the particle 20 lose part of its charge, new gas ions will intersect it and recharge it to its equilibrium state.

A spherical charged particle exhibits a radial electric field at its surface proportional to its charge $q$, $$E_r = \frac{q}{A} \times \frac{1}{E} = \frac{q}{4\pi r}E$$

where A is the surface area, $r$ is the radius and E the permitivity of the medium. For a charged particle placed in a uniform electric field, theoretical equilibrium will be established if the surface field is approximately equal to the external field for a nonconducting particle, and for a surface field equal to three times the external field for a conducting particle.

The uniform field breakdown strength of air at STP is $3 \times 10^6$ volts/meter for moderately short gaps, say up to two inches. This value increases with pressure. A nonuniform field configuration such as that shown in FIGURE 2 will flash over for average electrical field strengths less than the uniform field value.

Assuming a value of $0.5 \times 10^6$ volts per meter averaged over the surface of the particle under pressurized conditions (at least 10 atmospheres), the charge carried by a particle is thus, $$q = E_r 4\pi r^2 E$$

for a gas having a dielectric constant of unity, and $r$ measured in microns, the charge is $$q = E_r \frac{r^2}{9} \times 10^{-21} \text{ coulombs}$$

where $E_r$ is measured in volts per meter.

The mass of a particle whose radius is $r$ microns is thus, $$m = \pi 4/3 - r^3 \times 10^{-18} p \text{ kilograms}$$

where $p$ is the particle density in kilograms per cubic meter.

Thus the charge to mass ratio $q/m$ is thus, $$q/m = \frac{E_r \frac{r^2}{9} \times 10^{-21}}{4/3 \pi r^3 p \times 10^{-18}} = E_r \times \frac{10^{-3}}{12\pi pr} \text{ coulombs per kg.}$$

The electric field E theoretically necessary to keep a particle in equilibrium is $$E = \frac{g}{q/m}$$

Considering a maximum electric field of $E = 0.5 \times 10^6$ volts per meter, the maximum particle size can be determined as $$r = \frac{E \times E_r \times 10^{-3}}{12\pi pg} = 209 \text{ microns}$$

$$2r = 418 \text{ microns diameter}$$

A 10 micron particle requires a product E $E_r$ of $$EE_r = (0.5 \times 10^6)^2 \times \frac{(10)}{(418)}$$

When $E = E_r$ the electric field strength must be $$E = 0.78 \times 10 \text{ volts/meter}$$

Thus, the electrical suspension system appears to be capable of compensating for the gravitational forces of discrete particles in the size range from 400 microns to 10 microns with electric fields from $0.5 \times 10^6$ to $0.78 \times 10^5$ volts per meter for particles having a maximum density of 200 pounds per cubic foot.

The practicality of the method depends upon the particle density that can be handled without producing serious distortion of the electric field and sparkover. The larger the particle, the smaller the value of $(q/m)$, and the greater the mass of the particles per unit volume in the conduit for the same electric field distortions.

As previously stated, a particle is normally electrically neutral and must be charged so that the charged particle can be affected and suspended in an electric field. In addition, by charging the particles with like charges, they will repel each other thereby preventing the particles from becoming bunched, thereby decreasing the pumping requirements.

In any electrostatic system the force acting on a particle is the product of charge on the particle and the field strength. Thus, in a corona charging system, in order to suspend particles in a pipeline, the pipeline requires a source of negative gas ions such as one or more corona points or wires and a means for applying a vertical electric field to the gas ions on the charged particles.

A sufficient potential, such as 15 kv. (kilovolts), must be applied to a corona electrode to start the corona discharge. Once the discharge is started, the power supply must provide a current that increases rapidly for small increases in voltage. The current is carried away from the corona electrode by the charges on the gas ions and on the particles.

One simple purpose configuration for both charging and levitating the particles in a pipeline is shown in FIGURES 8 and 9. Two electrodes 26 and 36 are provided insulated from each other and in this case insulated from the pipeline 29. The lower electrode 26 is a corona wire and is made of sufficiently fine wire to obtain a corona discharge. The upper electrode 36 acts as a plane electrode with respect to the wire. The wire electrode 26 may have applied to it a negative voltage with respect to the upper electrode 36, for example 50 kv., such that a corona 38 occurs about the wire 26 and thus an uncharged particle will follow the path of travel 40 as indicated in FIGURE 8. As an uncharged particle drops towards the corona region 38, it is charged by the gas ions with the same polarity as the lower electrode 26. Thus, the corona discharge around the lower electrode 26 charges the uncharged particles, and the electric field between the electrodes 26 and 36 levitates the particles. Since the corona wire runs continuously along the bottom of the pipeline 29, the uncharged particles are charged as they fall towards the bottom and before they hit. Thus, the particles are charged when they require charging.

An alternative to a combined charging and levitating system is a system having a separate charging section to charge the particles and a section having electrodes to supply only the levitating electric field. Referring now to FIGURES 10, 11 and 12, separate charging and levitating sections are shown. Thus, in the charging section 42 a plurality of corona wires 44 and cross plates 46 are provided to obtain a region of corona discharge through which the particles passing through the pipeline 29 are carried, and thus charged. Thereafter, the charged particles pass into the separate levitating section 47 wherein a pair of electrodes such as plate electrodes 48 and 50 are provided, one or both of which are insulated from the pipeline 29 by insulation 30 whereby an electric field will be provided between the electrodes 48 and 50 upon the application of an electric voltage source between the terminals 52 and 54 connected to the plates 48 and 50, respectively. In the levitating section 47, it is noted that because of the shape of the electrodes 48 and 50 no corona discharge will occur as the electric field is not sufficient to cause a corona, but only suspension. As the charged particles pass through the suspension section 47, some of the particles will lose their charge by striking the upper electrode 50 and these discharged particles will have to be carried along by the gaseous carrier until they are passed through to the next charging section 42.

One problem of corona charging for particle suspension in pipe systems in which the particles are transported through the pipeline by a gaseous carrier under pressure is the fact that corona onset or beginning voltages increase with gas pressures. Whereas a voltage of 15 to 20 kv. may be sufficient to start a corona discharge in a 2-inch electrode spacing at atmospheric pressure, a voltage of the order of 200 kv. may be required for the same configuration at 400 p.s.i. pressure of air or similar gas. Such a high voltage requirement raises problems of power supplies and bushings designed for the auxiliary equipment required to furnish such voltages.

In order to overcome the insulation problems raised by high voltage power supplies, a high voltage power supply 56, as best seen in FIGURES 13 and 14, may be provided in a housing 58 adjacent the charging section in a pipeline 29 in which the power supply is exposed through an opening 60 to the gaseous pressures in the pipeline 29 which aid in the insulation of the power supply 56 and eliminate the need for high voltage power cables and bushings external to the pipe. In that event only a low voltage input 62 to the housing 58 is required.

As another alternative to overcoming the high voltage requirements for providing a corona discharge in the presence of a high gas pressure a shielded corona electrode may be provided as best seen in FIGURES 15 and 16. Thus, a corona wire 64 may be provided coaxially in a conduit 66 and which is provided with a shielded screen electrode 68 surrounding the wire electrode 64. In this structure the corona discharge is developed about the wire electrode 64 in a small diameter region thereby reducing the magnitude of the required corona onset voltage and yet the gas ions may pass through the screen and charge the particles positioned between the screen and the outer electrode, which in this case may be the walls 66 of the conduit itself. Thus, a voltage $V_1$ is sufficient to provide a corona discharge from the ground electrode 64 and the voltage $V_2$ is higher than $V_1$ by an amount required to cause the gas ions to flow out through the screen electrode 68.

For an electrical particle suspension system in a metal pipeline which is to be placed in the ground the following criteria should be observed: (1) the metallic pipe should be placed at electrical ground potential; (2) the electrodes and electrical insulation should require only a minimum amount of the pipe's cross-sectional area; and (3) the electrical components should be designed for insertion from the end of each pipe section and be suitable for pipe to pipe interconnection.

Several cross-sectional configurations and arrangements have been previously described for self charging and suspension electrode systems. Referring now to FIGURE 17, the simplest type would probably be where the wall of the pipe 29 would be used as the upper electrode and a single lower electrode 80 is provided which is insulated from the pipeline by a partial electrical insulator 82. FIGURE 18 shows a similar configuration wherein the total inner circumference of the pipe 29 is covered with an insulation 84 thereby requiring the use of a separate upper electrode 86.

Referring now to FIGURE 6, another configuration for providing a structure for charging and levitating particles in a pipeline is shown. Thus, one or more corona wires 88 are mounted above an electrode 90, which is in turn insulated from the pipeline 29 by insulation 92 around a portion of the inside of the pipe 29. The top of the pipe 29 may act as the upper or ground electrode if the corona wires are operated at maximum negative potential. The gas ions are formed in the vicinity of the corona wires and drift upwardly along the lines of electric field and they will collide with and ionize any particles in the pipe 29 that are not fully ionized. The particles then constitute a space charge and tend to shape the electric field in the drift space to the constant value at which they overcome the force of gravity, and thus are suspended in the pipe 29.

Space charge is the effect of the charge carried by the particles on the electric field applied by the electrical system. The space charge tends to distort the electric fields both in the interelectrode space and along insulating surfaces. The influence of the space charge is proportional to the charge density. Hence, for high particle flow rates, the space charge of the particles may become the limiting factor in systems using electric field suspension. One effect of the space charge on the interelectrode field is to distort the field so that it becomes more intense towards the upper electrode and less intense toward the lower electrode. Another result of the space charge is the high level of the electric field produced toward the upper electrode which may become strong enough for local electric field breakdown and sparkover. Still another effect of the space charge is that the charges may become deposited on the insulating surfaces within the pipe and reduce the electric field around the lower electrodes so that levitation is not obtained. The effect of the space charge can be controlled both in the gas volume within the pipe 29 and along the surface insulation by using field-shaping electrodes 32 as shown in FIGURE 7. Referring now to FIGURE 7, a more complicated configuration is shown where in addition to the corona wires 94 and the structure of FIGURE 6 a plurality of field electrodes 32 are provided at intermediate voltages to better control the electric field in the pipe 29 and thus to avoid concentrations of the electric field that could lead to premature flashover.

As previously mentioned the charging of the particles could be done by either corona charging, induction charging, or friction charging. Induction charging is the name given to the process whereby the particles are charged by contact with one of the electrodes. Consider the negative electrode of a two-electrode system energized by a voltage V. The electrodes have a capacitance C such that the negative electrode has a negative electronic charge $q=-CV$ on its surface. As the particle hits the surface, the negative charges coat the particle and the power supply supplies additional charges to replenish those used to coat the particles. Once the particle is coated, the electric field between the electrodes applies a force to the particle, directing it toward the opposite electrode. The electric field at the surface has only to be strong enough to lift the charged particles. The process is not pressure dependent since a corona discharge is not involved; as a matter of fact, the gas pressure permits the use of higher electric field strengths. Either of the configurations shown in FIGURES 17 and 18 are suitable for induction charging. In addition, the cross-sectional configuration shown in FIGURE 20 having upper and lower electrode plates 70 and 72 insulated from the pipeline 29 is satisfactory. While the configuration of FIGURE 20 will require higher operating voltages to secure the necessary values of electric field at the electrode surfaces to lift the particles, they will affect a larger area of the pipe than the wire electrodes shown in FIGURES 17 and 18 and will thus lift the particles higher into the gas stream.

And as mentioned another method of charging the particles is by friction charging. The process of charging a body by friction is contacting or rubbing the body with another material to add or remove electrons. Of course, to produce a desired levitating force in a pipeline, the proper relationship between the particles being transported and the charging material must be chosen. By way of example only, and referring to FIGURE 19, a pipeline 29 was insulated by insulation 96 of an acrylic plastic. Inside the insulation a top electrode 98 of No. 14 copper wire was glued, and a bottom copper electrode 100, 1-inch wide and 4-mils thick was provided. With the top electrode positively charged and the bottom electrode grounded, it was found in tests that an average reduction in the solids pressure drop over pipes without electrodes was about 55 percent. In addition the minimum or "fall out" velocity of the solids was reduced significantly. Surprisingly, it was found that with no external voltage applied to the electrodes 98 and 100 that a voltage gradient did exist between the electrodes and that there was a reduction in solids pressure drop of about 40 percent compared to similar conditions in a pipe without electrodes.

However, as is to be expected, variables such as moisture and the chemical nature of the solids transported through the pipe will have a pronounced influence on the friction charge and electrical forces on the particles. For instance, in testing the friction charging effects on clean dry sand through the pipe of FIGURE 19 it was found that the pressure drop was higher than that in a similar pipe without electrodes. It was found that by coating the dielectric nonconducting particles of sand with finer conducting particles of coal the pressure drop was lower than that in a similar pipe without electrodes. For instance, by adding about 0.1 percent by weight of coal powder to sand, the levitation effect and the pressure drops characteristic of the sand would approximate that of coal.

In operation, it is desired to transport various materials through a pipeline wherein the materials are in the form of particles which are suspended in a gaseous carrier which is pumped through the pipeline under pressure. However, in order to reduce the saltation or falling out of the particles to the bottom of the pipeline thereby decreasing the pumping requirements it is proposed that the particles be suspended or levitated in the pipeline by means of electric forces. This has been found feasible by first electrically charging the particles and then creating an electric field force on the charged particle which acts in a direction to levitate or suspend the particles in the pipeline.

First, the particles must be electrically charged. One method of charging is to provide an electrical corona discharge around a fine wire or set of points so as to produce gas ions which may strike and coat the particles. Thus, FIGURE 2 shows a corona wire 16 producing a corona discharge 18 upon the application of a voltage across the electrodes 14 and 16. It is noted that the field of FIGURE 2 will not provide a net levitating effect since the wire electrode 16 is coaxial with the pipe or outer electrode 14 in all directions about the wire electrode 16. Similarly, the more sophisticated corona charging section 42 shown in FIGURES 10 and 11 will also produce a corona discharge from the corona wires 44, but since it is surrounded by electrode plates 46 and the metal pipe 29 will not provide a net levitating effect.

However, configurations such as shown in FIGURES 6, 7, 8, 9 and 17–18 will provide a self charging and levitating system since the system includes upper and lower electrodes with the lower electrode being a corona discharge electrode or electrode assembly which not only creates a corona discharge for charging the particles, but also serves as an electrode which to create an electric field which will levitate the particles. As shown particularly in FIGURES 8 and 9, this system will charge any uncharged particle carried in the gas stream in the pipe 29 which may drop towards the corona region.

In the event that the transmission of the particles through the pipeline is being done in the presence of a high pressure gas a suitable high voltage power supply must be used. In that event, the high voltage power supply may be, as shown in FIGURES 13 and 14, positioned in communication with the pipeline 29 and the high pressure gases which will tend to insulate the high voltage power supply 56 and avoid the necessity of high voltage cables and bushings external to the pipeline 29. Alternatively, the corona structure shown in FIGURES 15 and 16 may be utilized wherein the corona wire 64 is surrounded by a screen electrode 68 which lowers the total voltage requirements and allows the development of a corona discharge around the electrode 64 and provides for the passage of gas electrons through the screen electrode 68 towards the outer conduit housing or electrode 66 to charge the particles between the screen 68 and the electrode 66.

Instead of corona charging, the particles may be charged by induction whereby they are charged when in contact with one of the electrodes. Thus, by use of the configuration in FIGURES 1, 17, 18, 19 and 20, the uncharged particles may contact the surface of the lower electrode whereby they become charged, and the electric field between the positive and negative electrodes applies a force to the now charged particle lifting it towards the opposite electrode.

While the cross-sectional configuration shown in FIGURES 17 and 18 provides the simplest type of system it may be desirable to provide a different configuration to control the electric field in the pipeline 29 and thus as shown in FIGURE 6 a plurality of corona wires 88 may be utilized to better control the electric field in the pipe t oavoid voltage gradients of electric field that could lead to premature flashover. For still better shaping of the field, field shaping electrodes 32, as best seen in FIGURE 7, may be mounted along the inner walls of the pipe 29 on insulating surfaces and connected to voltage sources intermediate between the upper and lower electrode levels and by applying suitable voltage to these electrodes the electric field will be shaped and graded so as to secure optimum control of the particles.

Of course, the expense of electrically charging the particles can be avoided by charging the particles by friction as in the configuration of FIGURE 19 wherein the particles are charged by friction as they are moved along the pipe and rub against the insulator 96. And while not as effective as corona charging, friction charging in many applications provides sufficient levitation of particles to substantially reduce pressure drop and the saltation velocity, both with and without an electric source being applied across the electrodes 98 and 100. And, the process of friction charging can also be made applicable to dielectric nonconducting particles by coating the particles with a conducting coat which allows the particle to be adequately charged by friction to cause levitation.

It is believed that the method of the invention is apparent from the foregoing description of presently preferred apparatus of the invention. The method, however, comprises maintaining particles in suspension while they are being moved along a conduit by electrically charging the particles and subjecting them to an electric field. The method also includes applying an electric field for the length of the conduit for levitating the charged particles. The method further comprehends providing corona discharge along the conduit parallel to the longitudinal axis of the conduit and then applying an electric field within the conduit for levitating the charged particles. The method further comprehend providing an electric field in a conduit to produce a net electric force upward on charged particles, and providing intermediate electrodes in the field to control the electrical field distribution within the conduit. The method further comprehends improving the levitation of a dielectric nonconducting particle by coating the particles with a conducting material so that the particles can be easily charged by friction.

The present invention, is well suited to carry out the objects and attain the ends and advantages mentioned as well as others inherent therein. While presently preferred embodiments of the invention are given for the purpose of disclosure, numerous changes in the details of construction, arrangement of parts and steps of the process may be made which will readily suggest themselves to those skilled in the art and which are encompassed within the spirit of the invention and the scope of the appended claims.

What is claimed is:

1. In combination with a gaseous carrier system having a conduit with a gaseous carrier therein transporting particles through the conduit, electrical means for maintaining the particles in suspension in the gaseous carrier comprising, means electrically charging said particles in said conduit, and means parallel to the conduit for providing an electric field in the conduit in a direction for levitating the particles for overcoming the gravitation effect on said particles.

2. In combination with a gaseous carrier system having a conduit with a gaseous carrier therein transporting particles through the conduit, electrical means for maintaining the particles in suspension in the gaseous carrier comprising, corona discharge means positioned inside and parallel to the axis of the conduit for charging said particles in the conduit, and electrical means positioned parallel to the axis of the conduit for electrically levitating the charged particles.

3. The invention of claim 2 wherein, the corona discharge means is positioned along the bottom and inside of the conduit.

4. In combination with a gaseous carrier system having a pipeline with a gaseous carrier therein transporting particles through the pipeline, electrical means for maintaining the particles in suspension in the gaseous carrier comprising, a pair of plates positioned in said pipeline and parallel to the longitudinal axis of the pipeline, and an electric source connected to each of the plates for applying an electric field for charging the particles and lifting the particles against gravity.

5. The invention of claim 4 wherein the plates are arcuately shaped in cross-section.

6. In combination with a gaseous carrier system having a metal pipeline with a gaseous carrier therein transporting particles through the metal pipeline, electrical means for maintaining the particles in suspension in the gaseous carrier comprising, a metal electrode positioned inside, along the bottom and parallel to the longitudinal axis of the pipeline, and insulated from the pipeline, and an electric source connected to both the metal pipeline and to the metal electrode thereby creating a corona discharge around the electrode for charging and levitating the particles for overcoming the gravitation effect on said particles.

7. In combination with a gaseous carrier system having a metal pipeline with a gaseous carrier therein transporting particles through the metal pipeline, electrical means for maintaining the particles in suspension in the gaseous carrier comprising, a plurality of metal wires positioned inside of and parallel to the longitudinal axis of the pipeline and insulated from the pipeline, and an electric source connected to both the metal wires and to the pipeline thereby creating a corona discharge and an electric field to charge and suspend particles in said pipeline.

8. The invention of claim 7 where, different voltages are applied to some of the wires.

9. In combination with a gaseous carrier system having a pipeline with a gaseous carrier therein transporting particles through the pipeline, electrical means for maintaining the particles in suspension in the gaseous carrier comprising, a metal wire electrode positioned inside of and adjacent to the bottom of the pipeline and parallel to the axis of the pipeline, means insulating the wire electrode from the pipeline, a metal plate electrode positioned inside of and adjacent to the top of the pipeline and parallel to the axis of the pipeline, means insulating the plate electrode from the pipeline, and means for applying a voltage across the two electrodes in a direction to levitate said particles.

10. In combination with a gaseous carrier system having a pipeline with a gaseous carrier therein transporting particles through the pipeline, electrical means for maintaining the particles in suspension in the gaseous carrier comprising, a first electrode for providing a corona discharge for charging particles positioned coaxially in the pipeline, a screen electrode positioned about the electrode, a plate electrode positioned outside of and spaced from the screen electrode, and an electric source connected to each of the first electrode, screen and plate with the screen at a voltage intermediate the first electrode and plate.

11. In combination with a gaseous carrier system having a pipeline with a gaseous carrier therein transporting particles through the pipeline, electrical means for maintaining the particles in suspension in the gaseous carrier comprising, a particle charging section, said section including, at least one corona discharge electrode positioned in and parallel to the longitudinal axis of the pipeline, at least a second electrode positioned in said pipeline and parallel to the corona electrode, and a voltage source applied across the corona electrode and the second electrode to provide a corona discharge for charging particles in said charging section, and a particle suspension section including, upper and lower plate electrodes parallel to the longitudinal axis of the pipeline, and a voltage connection across said upper and lower plates for creating an electric field across the plate electrodes for levitating charged particles therebetween.

12. In combination with a gaseous carrier system having a pipeline with a gaseous carrier therein transporting particles through the pipeline, electrical means for maintaining the particles in suspension in the gaseous carrier comprising, upper, lower, and intermediate electrodes positioned parallel to the longitudinal axis of the pipeline and in said pipeline, and voltage energization means connected to said upper, lower and intermediate electrodes at selected voltages to control the electric field distribution in said pipeline.

13. In combination with a gaseous carrier system having a pipeline with a gaseous carrier therein transporting particles through the pipeline, electrical means for maintaining the particles in suspension in the gaseous carrier comprising, first and second electrodes positioned parallel to the longitudinal axis of the pipeline, one of said electrodes being a corona discharge electrode, a high voltage power supply connected between said first and second electrodes to provide a corona discharge for charging particles, said power supply being positioned in communication with the pipeline and with the gas therein thereby assisting in insulating the power supply.

14. In combination with a gaseous carrier having a conduit with a gaseous carrier therein transporting particles through the conduit, electrical means for maintaining the particles in suspension in the gaseous carrier comprising, an upper and lower electrode in said conduit, means around the inner wall of the conduit for charging the particles by friction as they move along and rub said means, said charge being of a polarity relative to the electrodes to levitate said particles in the conduit.

15. The invention of claim 14 including,
electrical supply means for applying an electric field across the electrodes to act on the charged particles to increase the levitating force.

16. In combination with the method of transporting dielectric particles in a gaseous carrier system having a pipeline with a gaseous carrier therein transporting particles through the pipeline, the method of maintaining the particles in suspension in the gaseous carrier comprising,
coating the dielectric particles with an electrically conductive coating,
charging the coated particles by friction charging, and
applying a vertically directed electric field within the conduit for levitating the charged coated particles.

17. In the method of transporting particles in a gaseous carrier system having a pipeline with a gaseous carrier therein transporting particles through the pipeline, the improvement comprising,
transporting particles having a maximum density of 200 pounds per cubic foot in a gaseous pressure of at least 10 atmospheres,
electrically charging said particles, and
applying a vertically directed electric field in the pipeline in the range of from $0.5 \times 10^6$ to $0.78 \times 10^5$ volts per meter for levitating the charged particles.

References Cited

UNITED STATES PATENTS

| | | | |
|---|---|---|---|
| 2,600,129 | 6/1952 | Richards | 317—3 |
| 2,659,841 | 11/1953 | Hampe | 317—3 |
| 3,179,849 | 4/1965 | Schweriner. | |

LEE T. HIX, *Primary Examiner.*

U.S. Cl. X.R.

317—262; 302—64, 66